Jan. 13, 1959

R. G. TAYLOR ET AL 2,868,249

WOODWORKING APPARATUS

Filed Jan. 23, 1956

INVENTORS,
RICHARD G. TAYLOR
JUNIUS O. PUCKETT
BY

Jan. 13, 1959  R. G. TAYLOR ET AL  2,868,249
WOODWORKING APPARATUS
Filed Jan. 23, 1956  2 Sheets-Sheet 2
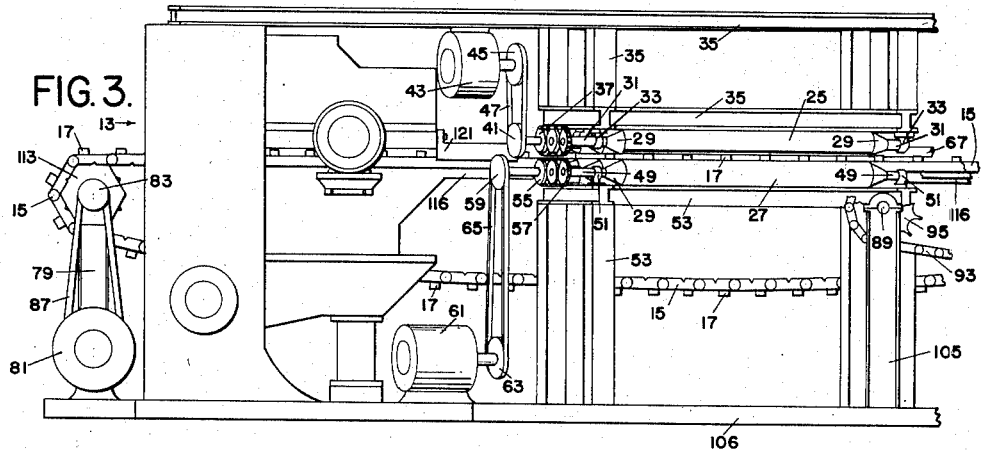
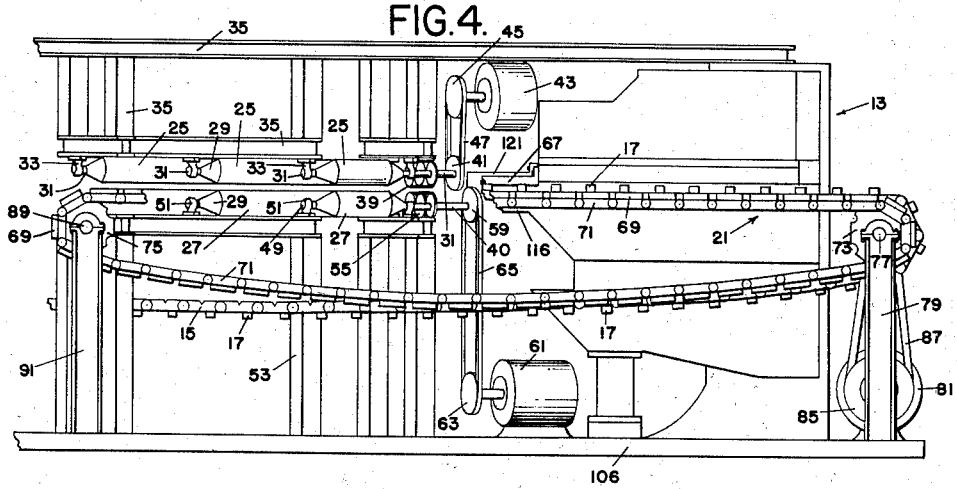
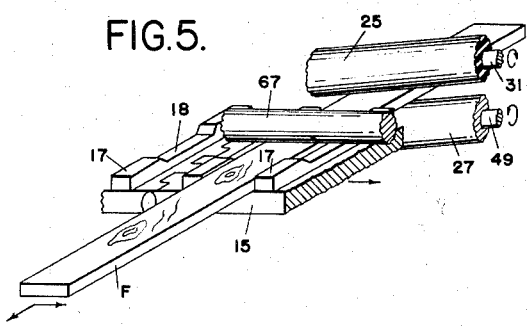
*INVENTORS,*
RICHARD G. TAYLOR
JUNIUS O. PUCKETT
BY United States Patent Office 2,868,249
Patented Jan. 13, 1959

2,868,249

WOODWORKING APPARATUS

Richard G. Taylor and Junius O. Puckett, Memphis, Tenn.

Application January 23, 1956, Serial No. 560,554

17 Claims. (Cl. 144—91)

This invention relates to woodworking apparatus, particularly to apparatus designed for forming the ends of strips of lumber as flooring and the like.

As is known by those skilled in the art, apparatus for forming tongues and grooves in the opposite ends of strips of flooring are commonly called end-matchers, and in the following description from time to time end-matchers will be referred to in the application of the present invention, but without intent to limit the scope thereof, it being understood that the present invention may be applied to other end forming or woodworking machines as tenoners and the like.

Heretofore in the feeding of the strips of lumber to end-matchers and the like wherein two separate operations are performed on the opposite ends of the lumber, two operators have been required, one operator feeding one of the end-matchers, and another operator subsequently feeding the other of the end-matchers. Various attempts have been made to provide means for automatically feeding end-matchers and the like, but without success due to the different lengths of the lumber, curvature in the lumber and various uncontrollable manufacturing variations.

It is contemplated in the present invention that novel means be provided in combination with end-matchers and the like whereby woodworking apparatus is provided in which only one operator is required in contradistinction to the hereinabove mentioned need for two operators.

It is further contemplated that such apparatus be provided wherein the lumber after being fed by the operator to the first woodworking machine is automatically positioned and fed to the second woodworking machine.

It is further contemplated that such apparatus be provided which is characterized by simplicity and efficiency, and which will accommodate different lengths and variations in the strips of lumber.

It is further contemplated that such apparatus be provided wherein the ends of the strips of lumber are carried between adjacent lugs of a conveyor during the successive operation thereupon, the strips being shifted and positioned for said operation by positioning means while being held between said lugs.

The principal object of the present invention is to provide novel woodworking apparatus for forming the opposite ends of lumber.

A further object is to provide such woodworking apparatus wherein successive operations are automatically performed on the lumber with only the need of one operator feeding the apparatus in contrast to the practice of having separated machines requiring an individual operator for each machine.

A further object is to provide such woodworking apparatus including a pair of spaced end forming machines, an end carrying conveyor disposed for successive feeding of the lumber to the end forming machines, and means for positioning the lumber on the conveyor for work on the ends thereof.

A further object is to provide such positioning means in the cycle of operation between the end forming operations, said positioning means being characterized by simplicity and efficiency and being effective to move the lumber sidewise at a speed equal to the speed of the end carrying conveyor, while moving the lumber lengthwise to a position for subsequent operation thereupon by the second end forming machine.

A further object is to provide such positioning means including rollers having their axes skewed relative to the end carrying conveyor and rotating at a speed which is effective to move the lumber sidewise at the same speed as the end carrying conveyor while simultaneously shifting the lumber lengthwise from a position in which one end is carried on the end carrying conveyor to a position in which the other end is carried on the end carrying conveyor.

A further object is to provide a pair of feed conveyors, an end carrying conveyor moving at the same speed as said feed conveyors, and means for shifting lumber lengthwise from one of said feed conveyors to the other of said feed conveyors while being carried sidewise by said end carrying conveyor and said feed conveyors.

A further object is to generally improve the design and construction of woodworking apparatus.

The means by which the foregoing and other objects of the present invention are accomplished and the manner of their accomplishment will be readily understood from the following specification upon reference to the accompanying drawings, in which:

Fig. 3 is an enlarged fragmentary side elevational view of the other end of the woodworking apparatus, with parts broken away for purposes of illustration.

Fig. 4 is an enlarged side elevational view of said other end of the woodworking apparatus shown in Fig. 3 as viewed from the other side thereof, with parts broken away for purposes of illustration.

Fig. 5 is a further enlarged fragmentary perspective view illustrating a strip of lumber passing between a pair of rollers while being carried sidewise by the conveyor.

Figure 1:
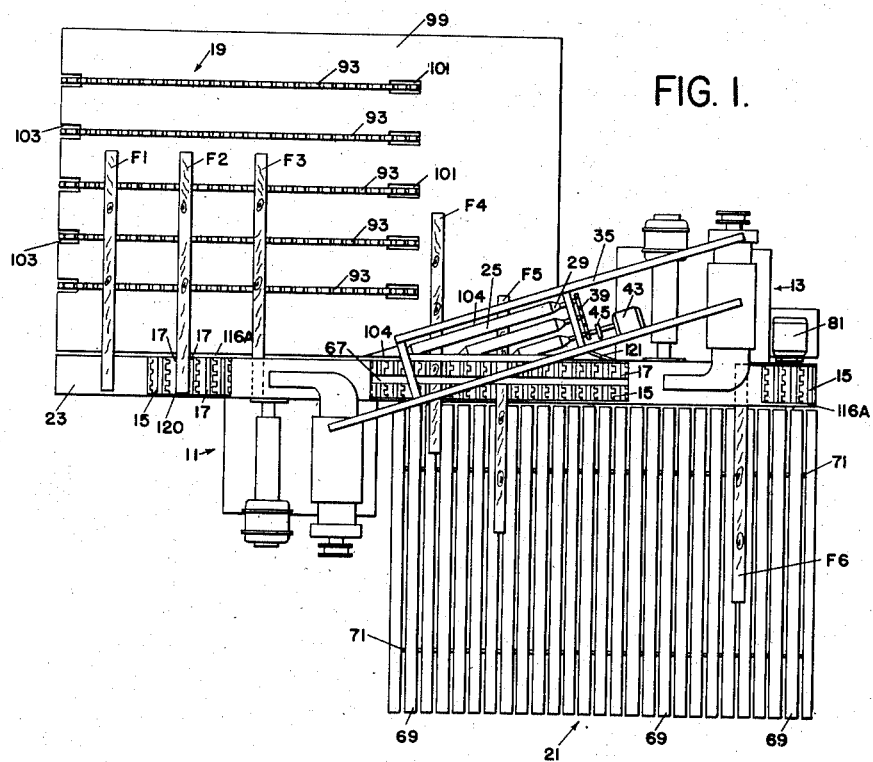
Fig. 1 is a plan view of the woodworking apparatus of the present invention.

Referring now to the drawings in which the various parts are indicated by numerals, the woodworking apparatus of the present invention comprises in general a pair of end forming machines, illustrated herein as end-matchers, a tongue-forming end-matcher 11 and a groove-forming end-matcher 13, joined by a continuous end carrying conveyor 15 disposed for successive feeding of the end-matchers.

It will be understood that the specific construction of the end-forming machines forms no part of the present invention. The end-forming machines may be of any type for forming the opposite ends of strips of lumber and in the present drawings are schematically illustrated as end-matchers, the details of which for the sake of simplicity have not been shown but may be of conventional construction, one type of construction being shown in Rose Patent No. 1,095,233, issued May 5, 1914.

End carrying conveyor 15 is preferably of the chain type and is movable in an endless path. Conveyor 15 is disposed so that the locus of any given point thereon is in a vertical plane, that is, when the conveyor is moved the path of any given imaginary point thereon will define an imaginary figure which is disposed in a vertical plane, and so that the upper flight or conveying portion thereof is disposed substantially in a horizontal plane. End carrying conveyor 15 is preferably of similar construction to the individual conveyor chains commonly employed in the separate end-matchers. In the present invention instead of the above mentioned separate conveyor chains, one chain or end carrying conveyor is substituted therefor thereby joining the end-matchers. Thus the end carrying conveyor 15 extends through the end-matchers 11, 13 for successive feed thereof. With a set of end-matchers thus joined by a single conveyor chain the end-matchers are diagonally alined as best illustrated in Fig. 1, although it will be understood that they may be alined otherwise as hereinafter set forth.

A plurality of lumber retaining means as transverse lugs 17 are spaced around the outer periphery of conveyor 15 and rigidly attached thereto. The upper edge of each of lugs 17 is preferably dished out as at 18. The width of conveyor 15 is preferably less than the minimum length of the strips of lumber which are intended to be formed in the apparatus of the present invention, said width being relatively narrow compared to the length of the conveyor.

The spacing between adjacent lugs 17 is greater than the maximum width of the strips of lumber which are intended to be formed in the apparatus of the present invention, whereby the conveyor 15 is adapted to carry the ends of the strips respectively between adjacent lugs 17 as will be more apparent from the hereinafter described operation of the apparatus.

Tongue-forming end-matcher 11 and groove-forming end-matcher 13 are preferably disposed relative to end carrying conveyor 15 in the positions best illustrated in Fig. 1 wherein tongue-forming end-matcher 11 is disposed in the cycle of operation before groove-forming end-matcher 13, it being understood that the upper or conveying portion of conveyor 15 moves from left to right of Fig. 1 to carry the lumber through the cycle of operation which comprises tongue-forming and then groove-forming. Thus in the preferred disposition tongue-forming end-matcher 11 is disposed adjacent one edge of conveyor 15 and groove-forming end-matcher 13 is diagonally disposed therefrom adjacent the opposite edge of the conveyor.

Additionally, in the preferred disposition shown a first feed conveyor 19 is disposed adjacent the edge of conveyor 15 opposite from tongue-forming end-matcher 11, and a second feed conveyor 21 is diagonally disposed from the first feed conveyor 19 on the edge of conveyor 15 opposite from groove-forming end-matcher 13.

It is not intended that the present invention be limited to the hereinabove described disposition of end-matchers 11, 13, and conveyors 15, 19 and 21, but the end-matchers and conveyors may be disposed otherwise, as for example tongue-forming end-matcher 11 and groove-forming end-matcher 13 may be oppositely diagonally disposed without departing from the scope of the present invention, that is, they may be disposed with groove-forming end-matcher 13 in the cycle of operation before tongue-forming end-matcher 11. Additionally, the first feed conveyor 19 and second feed conveyor 21 may be interchanged with the tongue-forming end-matcher 11 and groove-forming end-matcher 13.

First feed conveyor 19 and second feed conveyor 21 are preferably of the endless conveyor type disposed so that the locus of any given point thereon is in a vertical plane parallel to the movement of end carrying conveyor 15. The upper surface or conveying portion of conveyors 19, 21 are preferably in horizontal alinement with end carrying conveyor 15, whereby pieces of lumber are slidable from one conveyor to the other. The width of each of conveyors 19, 21 is preferably greater than the width of end carrying conveyor 15, whereby the end carrying conveyor 15 is adapted to carry the ends of the lumber with the conveyors 19, 21 adapted to carry the principal or remaining portion of the lumber.

First feed conveyor 19 and second feed conveyor 21 are movable so that the upper portion thereof moves from left to right as viewed in Fig. 1. Additionally, conveyors 19, 21 and 15 are preferably moved at the same speed.

An endless belt conveyor 23 may be provided at the feeding-in end of end carrying conveyor 15. It will be understood that the feeding-in end of conveyor 15 and conveyors 19, 21 is the left end of the conveyors as viewed in Fig. 1, and the feeding-out end is the opposite end thereof. Belt conveyor 23 is preferably of a short length compared to the length of end carrying conveyor 15 and the upper portion thereof is in the same horizontal plane with the upper portion of the end carrying conveyor 15 thereby forming an independent extension thereof.

In the preferred embodiment, first feed conveyor 19 extends from the feeding-in end of belt conveyor 23 parallel to and along a major portion of the end carrying conveyor 15. Second feed conveyor 21 preferably extends from a position opposite the feeding-out end of first feed conveyor 19 along a major portion of the length of end carrying conveyor 15 and preferably terminates adjacent the feeding-out end of the end carrying conveyor.

From the foregoing it will be understood that pieces of lumber, as for example a strip of flooring F, is adapted to be disposed transversely of the apparatus of the present invention and to be conveyed sidewise, that is, longitudinally of the apparatus from the feeding-in end thereof along the first feed conveyor 19 as one end of the flooring F is carried by end carrying conveyor 15 between a pair of adjacent lugs 17 and the remaining portion of the flooring carried by the first feed conveyor. After being conveyed to the end of first feed conveyor 19, flooring F is moved lengthwise between lugs 17 until the opposite end of flooring F is carried by end carrying conveyor 15 between said same pair of lugs 17, and the remaining portion of the flooring F is carried by the second feed conveyor 21. Thus the flooring is readily moved lengthwise from first feed conveyor 19 onto second feed conveyor 21 while being carried sidewise and while remaining between the same adjacent pair of lugs 17. It will be understood that such movement is easily effected since conveyors 15, 19 and 21 are disposed substantially at the same level and moving substantially at the same speed. Successive positions of the flooring during this movement are illustrated in Fig. 1 by the designations F1, F2, F3, F4, F5 and F6, respectively.

The positioning means for moving the pieces of lumber or flooring lengthwise through the adjacent lugs 17 forms an important feature of the present invention. Said positioning means is adapted to move the lumber sidewise at the same speed as conveyors 15, 19 and 21, and simultaneously to move the lumber lengthwise. The positioning means of the present invention is characterized by simplicity, with the two components of motion, sidewise and lengthwise movement, being accomplished by a single means. Said positioning means preferably comprises lumber contacting rollers, upper rollers 25 and lower rollers 27. In the preferred embodiment the rollers are operative in pairs, upper rollers 25 respectively overlying lower rollers 27, with the pairs of rollers being parallel to one another. Rollers 25, 27 are preferably disposed between end-matchers 11, 13 as best illustrated in Fig. 1.

Although three pairs of rollers are illustrated in the present drawings, it will be understood that the present invention is not limited to any specific number of pairs of rollers, but the number of pairs may be any suitable number. If desired, single rollers may be used instead of pairs of rollers.

Rollers 25, 27 are preferably spaced and the rollers disposed so that the spacing is substantially in horizontal alinement with the upper portion of conveyors 15, 19 and 21. Preferably upper rollers 25 are resilient, as for example the upper rollers may be formed of rubber or the like. The spacing between upper rollers 25 and lower rollers 27 is preferably less than the thickness of the lumber to be used, whereby the upper rollers and lower rollers will frictionally and tightly engage the pieces of lumber therebetween. The ends of rollers 25, 27 are preferably tapered or rounded as at 29 to facilitate entrance and exit of the work pieces into and out of the rollers. The feeding-in end of the rollers, that is, the end towards the feeding-in end of conveyor 15, preferably terminates adjacent the edge of end carrying conveyor 15 which is on the side of first feed conveyor 19, with the rollers diverging from said edge towards their feeding-out end. Thus the rollers are skewed or angularly disposed relative to end carrying conveyor 15.

The feeding-out end of rollers 25, 27 are preferably in alinement, as best illustrated in Fig. 1, whereby the pairs of rollers will be of decreasing length, with the pairs of rollers nearest second feed conveyor 21 being the shortest. It will be understood that it is not intended to limit the scope of the invention to any precise length of rollers, and the foregoing lengths described are merely for convenience of design.

Upper rollers 25 are respectively fixedly mounted on spindles 31 which extend axially of the rollers. Rollers 25 are rotatably mounted as by means of the spindles 31 being journalled adjacent the opposite ends of the rollers in bearings 33. Rollers 25 are supported from suitable supports as overhead supporting structure 35 as by means of bearings 33 being attached thereto. Supporting structure 35 may be formed of beams or the like, the structure preferably extending between and supported from end-matchers 11, 13.

Upper rollers 25 are preferably operably connected together for rotation in the same direction and at the same speed as by means of sprockets 37 respectively fixedly attached to spindles 31 adjacent the feeding-out end of rollers 25, the sprockets being linked by means of an endless chain 39 whereby upper rollers 25 are adapted to rotate together. One of spindles 31 may be extended outwardly from its related sprocket 37 and may be provided with a pulley 41 fixedly attached thereto. Pulley 41 may be rotated by suitable driving means as a motor 43 having a pulley 45 fixedly attached to the shaft thereof, which may be joined to pulley 41 as by means of a belt 47. From the foregoing it will be seen that motor 43 will drive upper rollers 25 in the same direction and at the same speed.

Lower rollers 27 are fixedly mounted on spindles 49 extending axially of the rollers. Lower rollers 27 are rotatably mounted as by means of spindles 49 being journalled in bearings 51 adjacent the opposite ends of the rollers. Rollers 27 are supported as by means of bearings 51 being attached to suitable base supporting structure 53.

In a manner similar to the drive of upper rollers 25, lower rollers 27 are driven together and at the same speed as upper rollers 25 but in an opposite direction thereto, the direction of rotation being indicated by the curved arrows in Fig. 5. The conjoint rotation of lower rollers 27 may be effected by means of sprockets 55 respectively fixed to spindles 49 adjacent the feeding-out end of lower rollers 27 and joined by means of an endless chain 57 engaging the sprockets. One of spindles 49 may be extended outwardly from its related sprocket 55 and may be provided with a pulley 59 fixedly attached thereto. Pulley 59 may be driven as by means of a motor 61 having a pulley 63 provided on the shaft thereof and connected to pulley 59 as by means of a belt 65.

It will be understood that it is not intended that the present invention be limited to the precise means of driving upper rollers 25 and lower rollers 27, since they may be driven otherwise without departing from the spirit and scope of the present invention. As for example, other pulley and sprocket arrangements may be employed and other types of drive units; or, if desired, a single motor may be employed with suitable gearing to reversely rotate the upper and lower rollers.

The speed of rotation of upper rollers 25 and lower rollers 27 and their degree of angularity relative to conveyor 15 is such that a strip of lumber conveyed therebetween will be moved lengthwise perpendicularly towards end carrying conveyor 15 while being simultaneously moved sidewise at the same speed of end carrying conveyor 15. It will be understood that this simultaneous movement lengthwise and sidewise is accomplished since rollers 25, 27 are skewed relative to the lumber and have two components of conveying motion. These components of conveying motion are indicated by the arrows at the end of the flooring F in Fig. 5. Additionally, it will be understood that any combination of angularity of rollers 25, 27 and speed of the rollers relative to conveyor 15 may be employed, which will effect a component of motion of a piece of lumber sidewise at substantially the same speed as conveyors 15, 19 and 21, while simultaneously effecting movement of the lumber lengthwise at a suitable speed which is fast enough to complete the lengthwise shift of the lumber through the rollers 25, 27 and onto conveyors 15, 21 before the lumber passes sidewise beyond the feeding-out end of the rollers.

An elongated bar 67 may be provided which closely overlies end carrying conveyor 15 between end-matchers 11 and 13, and may be attached to the end-matchers at the opposite ends of the bar. Thus bar 67 may be employed to insure that the pieces of lumber remain on end carrying conveyor 15 between lugs 17.

Second feed conveyor 21 may be any suitable type of conveyor and preferably has a broad flat upper conveying portion. Thus second feed conveyor 21 may be constructed as best illustrated in Figs. 1 and 4. In the construction shown, conveyor 21 is formed from a plurality of spaced strips 69 disposed transversely of the apparatus of the present invention attached around the periphery of, and carried by, a pair of spaced chains 71, which in turn engage and are supported by sprockets 73, 75. Sprockets 73 are fixedly attached to a shaft 77 extending axially thereof. Shaft 77 may be rotatably supported as by being journalled in suitable supporting means as posts 79 and may be driven by suitable driving means as motor 81.

A pulley 83 may be fixedly attached to the shaft 77 and may be coupled to a pulley 85 fixedly attached to the shaft of motor 81, the coupling being by means of a belt 87 or the like. Sprockets 75 are fixedly attached to a shaft 89 extending axially thereof, the shaft and sprocket being rotatably mounted as by means of the shaft being journalled in suitable supporting means as posts 91. From the foregoing it will be understood that motor 81 drives second feed conveyor 21, which in turn rotates shaft 89. Shaft 89 extends across to first feed conveyor 19 for the drive thereof in a manner as hereinafter set forth.

Figure 2:
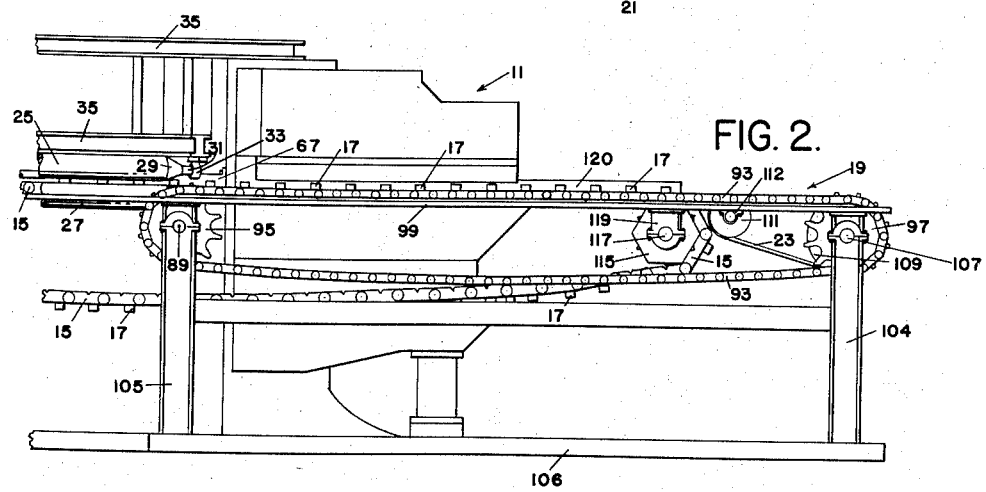
Fig. 2 is an enlarged fragmentary side elevational view of one end of the woodworking apparatus.

First feed conveyor 19 may be of similar construction to second feed conveyor 21, or may be of any other suitable conveyor construction. Thus one construction may be as best illustrated in Figs. 1 and 2 wherein first feed conveyor 19 comprises a plurality of laterally spaced endless driving chains 93 extending parallel to end carrying conveyor 15. Driving chains 93 rotate in a vertical plane with the upper conveying portions thereof extending horizontally. Driving chains 93 are preferably supported by and engage sprockets 95, 97 with the conveying or upper portion of the chains overlying a horizontally disposed table 99. Table 99 may be cut out as at 101 intermediate the ends of the table and as 103 along the leading edge of the table to accommodate the passage of chains 93 to and from the top and bottom of the table. Table 99 is preferably extended for a length past cut-outs 101 adjacent rollers 25, 27 whereby means is provided for supporting the flooring after it leaves driving chains 93. The corner of table 99 adjacent rollers 25, 27 is cut-off as at 104 to permit proper disposition of the rollers.

Table 99 may be supported by any suitable means, as for example supporting posts 104, 105. If desired, the apparatus of the present invention may be mounted on a suitable base, as base 106.

Sprockets 95 are fixedly mounted on shaft 89 with the shaft extending axially thereof and journalled in posts 105, whereby rotation of shaft 89 will drive sprockets 95 and first feed conveyor 19.

Sprockets 97 are fixedly mounted on a shaft 107 extending axially thereof, shaft 107 being journalled in posts 104. Additionally, a drum 109 is fixedly mounted on shaft 107 for drive of belt 23. Belt 23 extends around drum 109 and an idler drum 111 with the upper or conveying portion of the belt being disposed horizontally and substantially in horizontal alinement with first feed conveyor 19. Idler drum 111 may be rotatably supported as by the shaft thereof being journalled in a bearing 112 which in turn may be attached to and supported by table 99.

End carrying conveyor 15 may be driven and supported by any suitable means, as for example hexagonal sprockets 113, 115 engaging the opposite ends of the conveyor. The horizontal or conveying portion of end carrying conveyor 15 preferably rides over suitable supporting structure as a bed 116 which may be provided with upstanding guide rails 116A projecting from bed 116 adjacent the opposite edges of conveyor 15. Hexagonal sprocket 113 is preferably fixedly mounted on shaft 77 with the shaft extending axially thereof, whereby rotation of shaft 77 is effective to drive end carrying conveyor 15. Hexagonal sprocket 115 is fixedly mounted on a shaft 117 extending axially thereof, with shaft 117 being rotatably mounted as by means of shaft 117 being journalled in depending post 119, which is supported from table 99.

From the foregoing it will be apparent that drive of motor 81 will drive end carrying conveyor 15 and second feed conveyor 21, with second feed conveyor 21 effecting drive of first feed conveyor 19 which in turn effects drive of belt conveyor 23. It is not intended that the present invention be limited to the above mentioned means of drive of the various conveyors, but that they may be driven otherwise without departing from the spirit and scope of the present invention.

In the operation of the apparatus of the present invention the pieces of lumber or flooring are received adjacent the feeding-in end of first feed conveyor 19 by means of another conveyor, not shown, or by other suitable means, with the end of the flooring lying on belt conveyor 23, and the remainder thereof extending onto first feed conveyor 19, as designated at F1 in Fig. 1. An operator standing adjacent tongue-forming end-matcher 11 and adjacent the feeding-in end of end carrying conveyor 15 places the end of the flooring or lumber between a pair of adjacent lugs 17 with the end of the flooring agains an upstanding abutment 120. This positioning is illustrated in Fig. 1 at F2. The flooring is then conveyed sidewise by first feed conveyor 19 and end carrying conveyor 15 through tongue-forming end-matcher 11, as designated at F3. While passing through tongue-forming end-matcher 11 the end of the flooring receives a tongue in the end thereof by the end-matcher whose mechanisms are not herein described in detail since they form no part of the present invention but are well known to those skilled in the art, one type of construction being shown in Rose Patent No. 1,095,233, issued on May 5, 1914.

After the flooring has left tongue-forming end-matcher 11 and approximately as it is leaving first feed conveyor 19, the flooring is received by the positioning means and is conveyed lengthwise thereby until the opposite end of the flooring is positioned on end carrying conveyor 15. Thus by referring to Fig. 1 may be seen illustrative positions of the flooring as at F4 and F5 as the pieces of flooring are being conveyed lengthwise between upper rollers 25 and lower rollers 27.

A deflector 121 may be provided adjacent the edge of end carrying conveyor 15 on the first feed conveyor side thereof in the cycle of operation after the positioning means and before end-matcher 13. Deflector 121 more accurately alines the ends of the flooring as the ends abut deflector 121 when being conveyed by conveyors 15 and 21.

The ends of the flooring next pass through groove-forming end-matcher 13 where the flooring receives a groove in the ends thereof. The details of the groove-forming end-matcher 13 have herein been omitted as have been the details of tongue-forming end-matcher 11, since the present invention forms no part thereof, and likewise one type of construction thereof may be found by referring to Rose Patent No. 1,095,233, issued May 5, 1914. An illustrative position of the work piece passing through groove-forming unit 13 is shown at F6 in Fig. 1.

From the foregoing description of the operation and construction of the apparatus of the present invention, it is apparent that various lengths and variations in sizes and shapes of lumber or flooring will be accommodated by the apparatus of the present invention.

Additionally, it is apparent that woodworking apparatus is provided which is particularly adaptable to the hardwood flooring industry, thus providing means for eliminating one operator from a set of end-matchers heretofore not being possible, although various attempts have been made to accomplish this end. Further, it is apparent such means is provided which is characterized by efficiency and simplicity of construction, and easily adaptable to the existing woodworking machinery.

I claim:

1. Woodworking apparatus for forming the opposite ends of lumber comprising a pair of spaced end-matchers, an endless end carrying conveyor joining the end-matchers and disposed for successive feeding of the opposite ends of lumber to said end-matchers, driving means operably coupled to said end carrying conveyor for driving said conveyor, a first feed conveyor movable in an endless path adjacent to and synchronized with said end carrying conveyor whereby said first feed conveyor is adapted to convey lumber sidewise with the ends thereof carried by said end carrying conveyor and the remaining portion thereof carried by said first feed conveyor, a second feed conveyor disposed on the opposite side of said end carrying conveyor from said first feed conveyor and diagonally disposed relative to said first feed conveyor, said second feed conveyor being movable in an endless path adjacent to and synchronized with said end carrying conveyor whereby said second feed conveyor is adapted to convey lumber sidewise with one of the ends thereof carried by said end carrying conveyor and the remaining portion thereof carried by said second feed conveyor, said first feed conveyor being disposed adjacent one of said end-matchers and said second feed conveyor being disposed adjacent the other of said end-matchers whereby said first feed conveyor is adapted to feed lumber in conjunction with said end carrying conveyor to said one of said end-matchers and said second feed conveyor is adapted to feed lumber in conjunction with said end carrying conveyor to said other of said end-matchers, groups of rotatably mounted rollers disposed in the path of the lumber adjacent said end carrying conveyor between said end-matchers, said groups of rollers including an upper group and a lower group underlying the upper group, means for rotating said upper rollers in one direction at a common rate of speed, means for rotating said lower rollers in the opposite direction at the same speed, said groups of rollers being axially skewed relative to said end carrying conveyor and having a component of conveying motion in a direction to move the lumber lengthwise onto said second feed conveyor while being moved sidewise by said end carrying conveyor.

2. Woodworking apparatus for forming the opposite ends of lumber comprising a pair of spaced end forming machines, a unitary end carrying conveyor joining said end forming machines and disposed for successive feeding of the opposite ends of the lumber to said end forming machines, a plurality of lugs attached to said end carrying conveyor at spaced intervals on the periphery thereof, driving means operably coupled to said end carrying conveyor for driving said conveyor, a first feed conveyor movable in an endless path adjacent to and synchronized with said end carrying conveyor whereby said first feed conveyor is adapted to convey lumber with the ends thereof carried by said end carrying conveyor between adjacent pairs of said lugs and the remaining portion thereof carried by said first feed conveyor, a second feed conveyor disposed on the opposite side of said end carrying conveyor from said first conveyor and diagonally disposed relative to said first feed conveyor, said second feed conveyor being movable in an endless path adjacent to and synchronized with said end carrying conveyor whereby said second feed conveyor is adapted to convey lumber with one of the ends thereof carried by said end carrying conveyor between adjacent pairs of said lugs and the remaining portion thereof carried by said second feed conveyor, said first feed conveyor being disposed adjacent one of said end forming machines and said second feed conveyor being disposed adjacent the other of said end forming machines whereby said first feed conveyor is adapted to feed lumber in conjunction with said end carrying conveyor to said one of said end forming machines and said second feed conveyor is adapted to feed lumber in conjunction with said end carrying conveyor to said other of said end forming machines, said end carrying conveyor being of a relatively narrow width as compared respectively with the effective width of said first feed conveyor and said second feed conveyor and said end carrying conveyor width being less than the length of the shortest piece of lumber which said apparatus is adapted to form, positioning means disposed adjacent said end carrying conveyor between said end forming machines, said positioning means having a component of conveying motion in a direction to move the lumber lengthwise onto said second feed conveyor.

3. Woodworking apparatus for forming the opposite ends of lumber comprising a pair of spaced end-matchers, a single narrow endless unitary conveyor movable in an endless path and disposed for successive feeding of the opposite ends of lumber to said end-matchers, driving means operably coupled to said conveyor for moving said conveyor in said endless path, a plurality of peripherally spaced continuous lumber retaining means mounted on said conveyor adapted to receive the ends of the lumber between adjacent said means, and lumber positioning means adjacent said conveyor between said end-matchers for engaging a strip of lumber when carried by said conveyor, said lumber positioning means having a component of motion equal to and in the same direction of movement of said conveyor and having a component of motion substantially perpendicular to and towards said conveyor whereby the positioning means is adapted to move the lumber after operation upon one end thereof by one of the end-matchers along at the same speed as said conveyor and simultaneously to shift the lumber lengthwise from a position in which one end of the lumber is interposed between the lumber retaining means to a position in which the opposite end of the lumber is interposed between the retaining means for operation upon the opposite end of the lumber by the other end-matcher.

4. Woodworking apparatus for forming the opposite ends of lumber comprising a pair of spaced end forming machines, a single narrow end carrying unitary conveyor movable in an endless path and disposed for successive feeding of the opposite ends of lumber to said end forming machines, driving means operably coupled to said conveyor for moving said conveyor in said endless path, and lumber positioning means adjacent said conveyor between said end forming machines for engaging a strip of lumber when carried by said conveyor, said lumber positioning means having a component of motion equal to and in the same direction of movement of said conveyor and having a component of motion substantially perpendicular to and towards said conveyor whereby the positioning means is adapted to move the lumber after operation upon one end thereof by one of the end forming machines along at the same speed as said conveyor and simultaneously to shift the lumber lengthwise from a position in which one end of the lumber is carried by said conveyor to a position in which the opposite end of the lumber is carried by said conveyor for operation upon the opposite end of the lumber by the other end forming machine.

5. Woodworking apparatus for forming the opposite ends of lumber comprising a pair of spaced end forming machines, a single narrow end carrying unitary conveyor movable in an endless path and disposed for successive feeding of the opposite ends of lumber to said end forming machines, driving means operably coupled to said conveyor for moving said conveyor in said endless path, and lumber positioning means adjacent one side of said conveyor between said end forming machines for engaging a strip of lumber when carried by said conveyor, said lumber positioning means having a component of motion substantially perpendicular to and towards said conveyor whereby the positioning means is adapted to shift the lumber lengthwise after operation upon the end thereof from a position in which one end of the lumber is carried by said conveyor to a position in which the opposite end of the lumber is carried by said conveyor for operation upon the opposite end of the lumber by the other end forming machine.

6. Wooworking apparatus for forming lumber comprising woodworking machines, a single narrow end carrying conveyor movable in an endless path and disposed for successive feeding of said woodworking machines, driving means operably coupled to said conveyor for moving said conveyor in said endless path, a plurality of peripherally spaced continuous lugs mounted on said conveyor adapted to receive the lumber between adjacent said lugs, and groups of horizontally disposed rollers adjacent said endless conveyor between said woodworking machines for engaging the lumber, said groups of rollers comprising an upper group and a lower group underlying and spaced from said upper group whereby the lower and upper groups are adapted to receive lumber therebetween, said rollers having their axes disposed parallel to each other and to a line forming an angle with the path of movement of said endless conveyor, driving means driving at least one of said groups at a common speed for conveying the lumber between the groups, said speed and said angle being of a combination to move lumber conveyed by said rollers sidewise at a speed equal to the speed of said conveyor and lengthwise between said lugs whereby the lumber is shifted after operation upon one end thereof by one of the end-matchers from a position in which one end of the lumber is interposed between the lugs to a position in which the opposite end of the lumber is interposed between the lugs for operation upon said opposite end by the other woodworking machine.

7. Woodworking apparatus for forming the opposite ends of lumber comprising a pair of end-matchers, a single narrow end carrying conveyor movable in an endless path and disposed for successive feeding of said end-matchers, driving means operably coupled to said conveyor for moving said conveyor in said endless path, a plurality of peripherally spaced continuous lumber retaining means mounted on said conveyor adapted to receive the ends of the lumber between adjacent said means, and horizontally disposed rollers adjacent said endless conveyor between said end-matchers, said rollers being positioned to engage the lumber and having their axes disposed parallel to each other and to a line forming an angle with the path of movement of said endless conveyor, driving means driving said rollers at the same speed, said speed and said angle being of a combination to move lumber conveyed by said rollers sidewise at a speed equal to the speed of said conveyor and lengthwise between said retaining means whereby the lumber is shifted after operation upon one end thereof by one of the end-matchers from a position in which one end of the lumber is interposed between the retaining means to a position in which the opposite end of the lumber is interposed between the retaining means for operation upon said opposite end by the other end-matcher.

8. Woodworking apparatus for forming the opposite ends of lumber comprising spaced end-matchers, a unitary conveyor movable in an endless path and disposed for successive feeding of the opposite ends of the lumber to said end-matchers, driving means operably coupled to said conveyor for moving said conveyor in said endless path, rotatably mounted rollers disposed adjacent said conveyor between said end-matchers for engaging the lumber, means for rotating said rollers for conveying the lumber, said rollers having a component of conveying motion in a direction to move the lumber lengthwise while being moved sidewise by the conveyor.

9. Woodworking apparatus for forming lumber comprising spaced woodworking machines, a single narrow end carrying unitary conveyor movable in an endless path and disposed for successive feeding of lumber sidewise to said woodworking machines, driving means operably coupled to said conveyor for moving said conveyor in said endless path, lumber positioning means disposed adjacent said conveyor between said woodworking machines for engaging the lumber, said positioning means being skewed relative to said conveyor and having a component of conveying motion in a direction to move the lumber lengthwise while being moved sidewise by the conveyor.

10. Woodworking apparatus for forming lumber comprising spaced woodworking machines, a single narrow unitary end carrying conveyor joining said woodworking machines and disposed for successive feeding of lumber sidewise to said woodworking machines, a first feed conveyor adjacent one edge of said end carrying conveyor, a second feed conveyor adjacent the opposite edge of said end carrying conveyor and diagonally disposed relative to said first feed conveyor, means operably coupled to said end carrying conveyor, to said first feed conveyor and to said second feed conveyor for the drive thereof at substantially the same speed, positioning means adjacent said end carrying conveyor to engage lumber for moving the lumber lengthwise across said end carrying conveyor from said first feed conveyor to said second feed conveyor.

11. The combination with a set of end-matchers of lumber handling means comprising a single narrow unitary end carrying conveyor joining said end matchers for successive feed of said end matchers, a first feed conveyor adjacent one edge of said end carrying conveyor and adjacent one of said end-matchers, a second feed conveyor adjacent the opposite edge of said end carrying conveyor and adjacent the other of said end-matchers, said first feed conveyor and said second feed conveyor being diagonally disposed relative to each other, means operably coupled to said end carrying conveyor, to said first feed conveyor and to said second feed conveyor for the drive thereof at substantially the same speed, positioning means adjacent said end carrying conveyor and between said end-matchers for moving lumber lengthwise across said end carrying conveyor from said first feed conveyor to said second feed conveyor.

12. Woodworking apparatus for forming the opposite ends of pieces of lumber comprising a pair of spaced end forming machines, an endless narrow unitary conveyor movable in an endless path and disposed for successive feeding of the opposite ends of lumber to said end forming machines, a plurality of lugs attached to said end carrying conveyor at spaced intervals on the periphery thereof, a bar closely overlying a portion of said conveyor and extending between said end forming machines to define a plurality of substantially enclosed spaces adapted to receive respectively said pieces of lumber, each of said spaces being bounded on the bottom by said conveyor, on the sides by an adjacent pair of lugs and on the top by said bar.

13. Woodworking apparatus for forming the opposite ends of pieces of lumber comprising a pair of spaced end-matchers, an endless end carrying conveyor joining the end-matchers and disposed for successive feeding of the opposite ends of pieces of lumber to said end-matchers, a plurality of lugs attached to said end carrying conveyor at spaced intervals on the periphery thereof, a bar overlying a portion of said conveyor and extending between said end-matchers to define a plurality of substantially enclosed spaces adapted to receive respectively said pieces of lumber, each of said spaces being bounded on the bottom by said conveyor, on the sides by an adjacent pair of lugs and on the top by said bar, driving means operably coupled to said end carrying conveyor for driving said conveyor, a first feed conveyor movable in an endless path adjacent to and synchronized with said end carrying conveyor whereby said first feed conveyor is adapted to convey lumber sidewise with the ends thereof respectively received in said spaces and carried by said end carrying conveyor and the remaining portion thereof carried by said first feed conveyor, a second feed conveyor disposed on the opposite side of said end carrying conveyor from said first feed conveyor and diagonally disposed relative to said first feed conveyor, said second feed conveyor being movable in an endless path adjacent to and synchronized with said end carrying conveyor whereby said second feed conveyor is adapted to convey lumber sidewise with the ends thereof respectively received in said spaces and carried by said end carrying conveyor and the remaining portion thereof carried by said second feed conveyor, said first feed conveyor being disposed adjacent one of said end-matchers and said second feed conveyor being disposed adjacent the other of said end-matchers whereby said first feed conveyor is adapted to feed lumber in conjunction with said end carrying conveyor to said one of said end-matchers and said second feed conveyor is adapted to feed lumber in conjunction with said end carrying conveyor to said other of said end-matchers, groups of rotatably mounted rollers disposed in the path of the lumber adjacent said end carrying conveyor between said end-matchers, said groups of rollers including an upper group and a lower group underlying the upper group, means for rotating said upper rollers in one direction at a common rate of speed, means for rotating said lower rollers in the opposite direction at the same speed, said groups of rollers being axially skewed relative to said end carrying conveyor and having a component of conveying motion in a direction to move the lumber lengthwise onto said second feed conveyor.

14. Woodworking apparatus for forming the opposite ends of pieces of lumber comprising a narrow end carrying unitary conveyor movable in an endless path, a first end forming machine disposed adjacent one end of said conveyor, a second end forming machine spaced from said first machine and disposed adjacent the other end of said conveyor and on the opposite side thereof from said first end forming machine, positioning means disposed adjacent said end carrying conveyor between said end forming machines, said positioning means having a component of conveying motion in a direction to move the lumber lengthwise from a position in which one end of the piece of lumber rests on said conveyor to a position in which the other end rests on said conveyor, said direction being away from said second end forming machine.

15. Woodworking apparatus for forming the opposite ends of lumber comprising a pair of spaced end-matchers, an endless end carrying conveyor joining the end-matchers and disposed for successive feeding of the opposite ends of lumber to said end-matchers, driving means operably coupled to said end carrying conveyor for driving said conveyor, a first feed conveyor movable in an endless path adjacent to and synchronized with said end carrying conveyor whereby said first feed conveyor is adapted to convey lumber sidewise with the ends thereof carried by said end carrying conveyor and the remaining portion thereof carried by said first feed conveyor, a second feed conveyor disposed on the opposite side of said end carrying conveyor from said first feed conveyor and diagonally disposed relative to said first feed conveyor, said second feed conveyor being movable in an endless path adjacent to and synchronized with said end carrying conveyor whereby said second feed conveyor is adapted to convey lumber sidewise with one of the ends thereof carried by said end carrying conveyor and the remaining portion thereof carried by said second feed conveyor, said first feed conveyor being disposed adjacent one of said end-matchers and said second feed conveyor being disposed adjacent the other of said end-matchers whereby said first feed conveyor is adapted to feed lumber in conjunction with said end carrying conveyor to said one of said end-matchers and said second feed conveyor is adapted to feed lumber in conjunction with said end carrying conveyor to said other of said end-matchers, at least one rotatably mounted roller disposed in the path of the lumber adjacent said end carrying conveyor between said end-matchers, means for rotating said roller, said roller being axially skewed relative to said end carrying conveyor and having a component of conveying motion in a direction to move lumber lengthwise on to said second feed conveyor while being moved sidewise by said end carrying conveyor.

16. Woodworking apparatus for forming the opposite ends of pieces of lumber comprising a pair of spaced end-matchers, an endless end carrying conveyor joining the end-matchers and disposed for successive feeding of the opposite ends of pieces of lumber to said end-matchers, a plurality of lugs attached to said end carrying conveyor at spaced intervals on the periphery thereof, a bar overlying a portion of said conveyor and extending between said end-matchers to define a plurality of substantially enclosed spaces adapted to receive respectively said pieces of lumber, each of said spaces being bounded on the bottom by said conveyor, on the sides by an adjacent pair of lugs, and on the top by said bar, driving means operably coupled to said end carrying conveyor for driving said conveyor, a first feed conveyor movable in an endless path adjacent to and synchronized with said end carrying conveyor whereby said first feed conveyor is adapted to convey lumber sidewise with the ends thereof respectively received in said spaces and carried by said end carrying conveyor and the remaining portion thereof carried by said first feed conveyor, a second feed conveyor disposed on the opposite side of said end carrying conveyor from said first feed conveyor and diagonally disposed relative to said first feed conveyor, said second feed conveyor being movable in an endless path adjacent to and synchronized with said end carrying conveyor whereby said second feed conveyor is adapted to convey lumber sidewise with the ends thereof respectively received in said spaces and carried by said end carrying conveyor and the remaining portion thereof carried by said second feed conveyor, said first feed conveyor being disposed adjacent one of said end-matchers and said second feed conveyor being disposed adjacent the other of said end-matchers whereby said first feed conveyor is adapted to feed lumber in conjunction with said end carrying conveyor to said one of said end-matchers and said second feed conveyor is adapted to feed lumber in conjunction with said end carrying conveyor to said other of said end-matchers, at least one rotatably mounted roller disposed in the path of the lumber adjacent said end carrying conveyor between said end-matchers, means for rotating said roller, said roller being axially skewed relative to said end carrying conveyor and having a component of conveying motion in a direction to move the lumber lengthwise on to said second feed conveyor.

17. Woodworking apparatus for forming the opposite ends of pieces of lumber comprising a narrow end carrying unitary conveyor movable in an endless path, a first end-matcher disposed adjacent one end of said conveyor, a second end-matcher spaced from said first end-matcher and disposed adjacent the other end of said conveyor and on the opposite side thereof from said first end-matcher, positioning means disposed adjacent said end carrying conveyor between said end-matchers, said positioning means having a component of conveying motion in a direction to move the lumber lengthwise from a position in which one end of the piece of lumber rests on said conveyor to a position in which the other end rests on said conveyor, said direction being away from said second end-matcher, portions of said end-matchers being in overlapping relationship relative to one another and to said end carrying conveyor whereby the end carrying conveyor is adapted to feed successively the opposite ends of the pieces of lumber to the end-matchers.

References Cited in the file of this patent
UNITED STATES PATENTS

| | | |
|---|---|---|
| 547,481 | Burnham | Oct. 8, 1895 |
| 1,082,791 | Beugler | Dec. 30, 1913 |
| 1,702,185 | Weber | Feb. 12, 1929 |
| 1,706,675 | Osgood | Mar. 26, 1929 |
| 2,253,453 | Van Deinse | Aug. 19, 1941 |